United States Patent [19]

Temple

[11] 4,045,095
[45] Aug. 30, 1977

[54] EMERGENCY PORTION FOR BRAKE CONTROL VALVE

[75] Inventor: Fred Temple, Swissvale, Pa.

[73] Assignee: Westinghouse Air Brake Company, Wilmerding, Pa.

[21] Appl. No.: 699,624

[22] Filed: June 25, 1976

[51] Int. Cl.² ............................................. B60T 15/44
[52] U.S. Cl. ........................................ 303/37; 303/39; 303/69; 303/82
[58] Field of Search ....................... 303/33, 35, 36, 37, 303/38, 39, 69, 80, 81, 82, 86

[56] References Cited

U.S. PATENT DOCUMENTS

| | | | |
|---|---|---|---|
| 3,232,678 | 2/1966 | Wilson | 303/80 |
| 3,407,009 | 10/1968 | Racki | 303/80 |
| 3,706,480 | 12/1972 | Washbourn | 303/69 |
| 3,731,982 | 5/1973 | Paginton | 303/37 |
| 3,966,269 | 6/1976 | McEathron | 303/69 |
| 3,967,864 | 7/1976 | McEathron | 303/81 |

FOREIGN PATENT DOCUMENTS

1,023,222   3/1966   United Kingdom ................ 303/69

Primary Examiner—Trygve M. Blix
Assistant Examiner—Edward R. Kazenske
Attorney, Agent, or Firm—W. F. Poore; R. W. McIntire, Jr.

[57] ABSTRACT

An upgraded railway freight car brake control valve device comprises a novel emergency valve portion that embodies therein a plurality of simple and inexpensive poppet valves that replace yet perform the same functions heretofore performed by more expensive slide type valves which slide valves, and the flat seats upon which they slide as they are shifted from one position to another, in their manufacture require a considerable amount of accurate machining thus increasing the cost of the valve device of which they are an important part.

4 Claims, 2 Drawing Figures

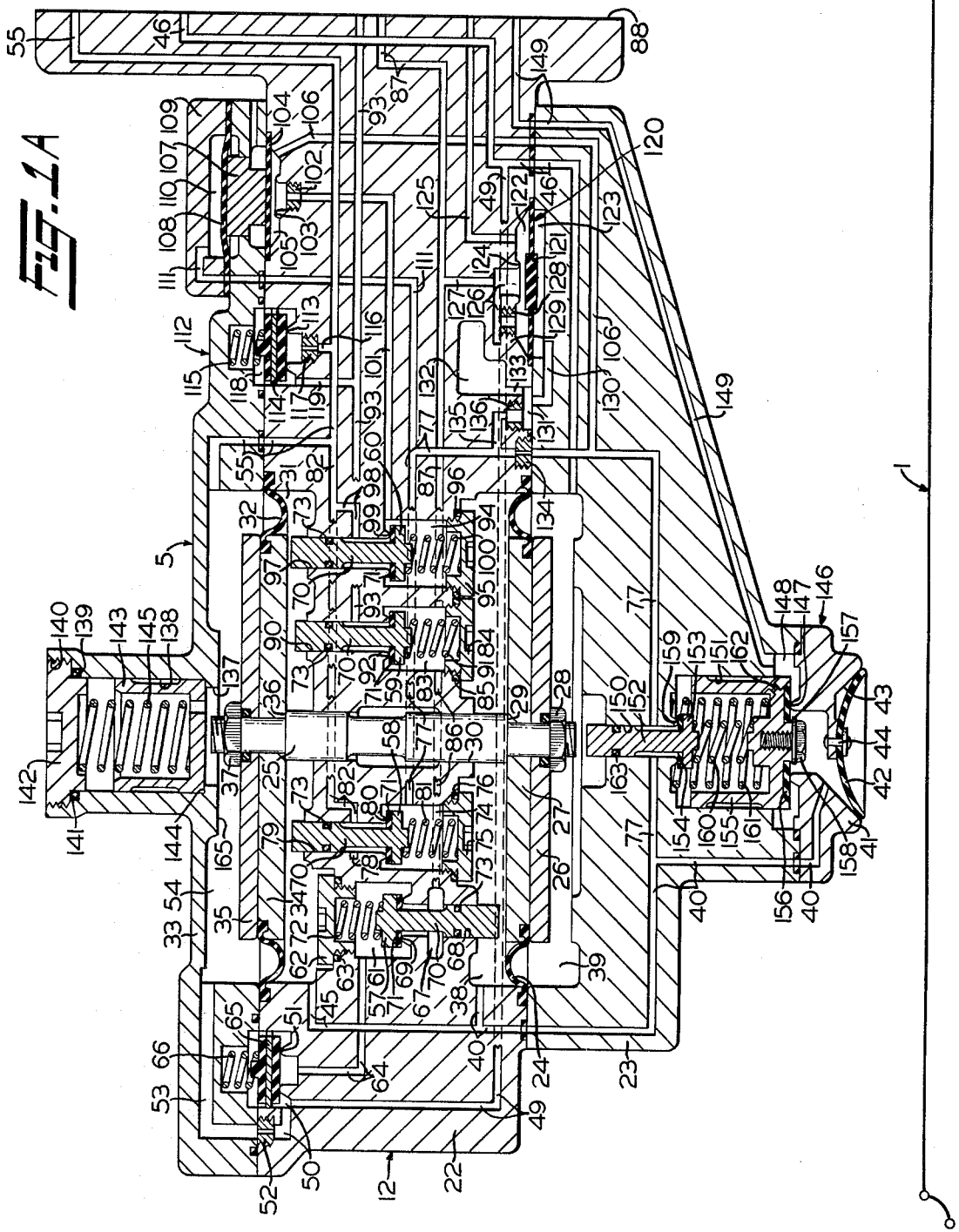

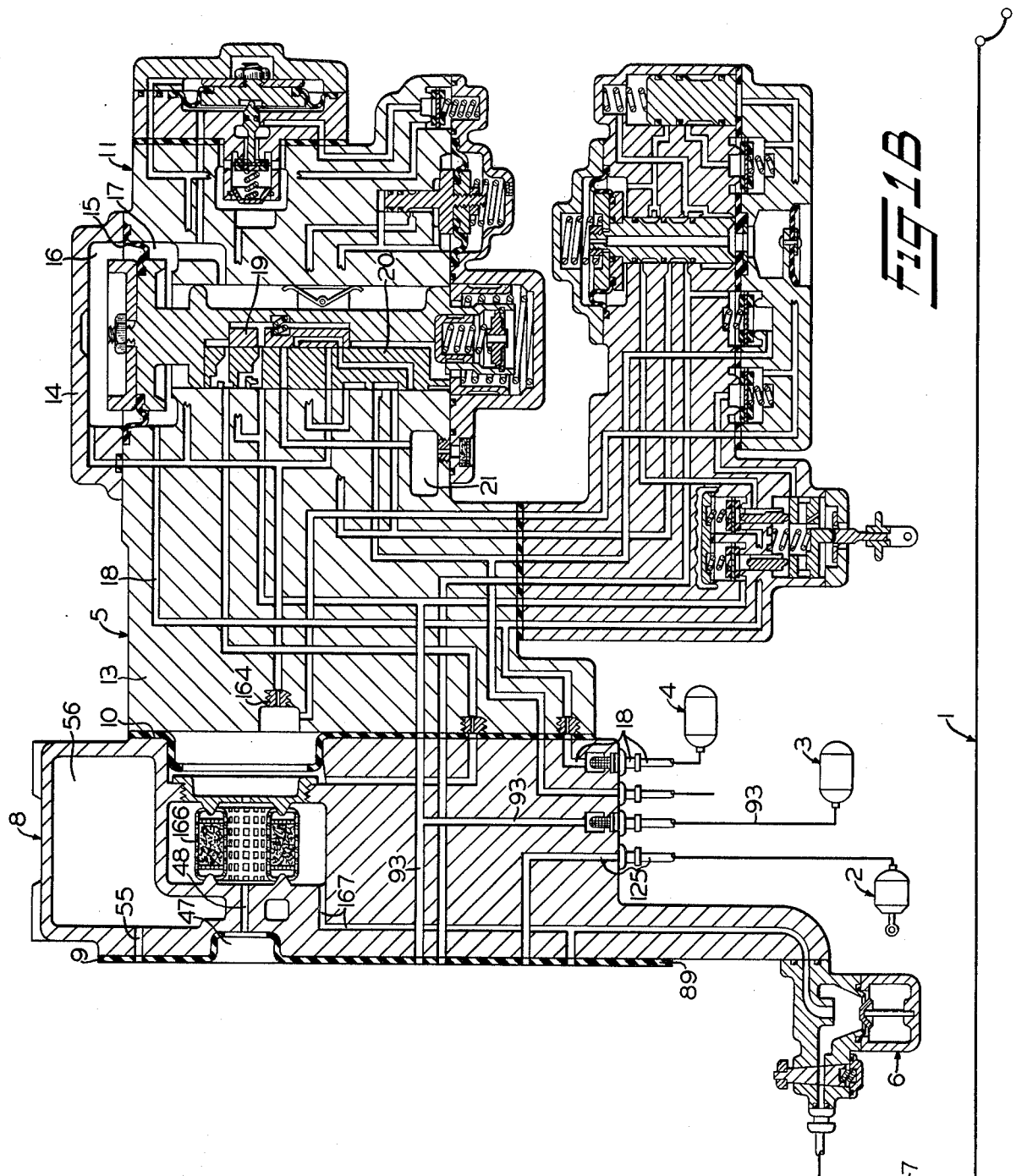

EMERGENCY PORTION FOR BRAKE CONTROL VALVE

BACKGROUND OF THE INVENTION

In U.S. Pat. No. 3,232,678, issued Feb. 1, 1966 to William G. Wilson, and assigned to the assignee of the present application, there is shown and described a brake control valve device that is substantially the same in function and operation as the brake control valve device included in the standard fluid pressure brake apparatus now in use on railway freight cars owned and operated by American railroads.

The brake control valve device shown in the above-mentioned U.S. Pat. No. 3,232,678 comprises a service valve portion embodying therein a plurality of slide, spool and disc type valves, and an emergency valve portion that has a slide-type emergency valve slidable on a flat ported valve seat and a graduating valve slidably mounted on a flat ported surface provided therefor on the side of the emergency slide valve opposite the side thereof that engages the flat ported valve seat. The manufacture and production of these slide-type valves and valve seats require considerable accurate and skillful machining which, as is readily apparent, increases the cost of the emergency valve portion of which they are an essential component.

Accordingly, it is the general purpose of this invention to provide a railway car brake control valve device with a novel emergency valve portion that embodies therein a plurality of simple and inexpensive poppet-type valves that are so disposed between and operated by a pair of spaced-apart and interconnected abutments, which are subject to atmospheric pressure on their adjacent sides and respectively to brake pipe pressure and quick action chamber pressure on their other side, as to perform the same functions as the emergency valve portion shown in the above-mentioned Wilson patent.

SUMMARY OF THE INVENTION

According to the present invention, a railway freight car brake control valve device that includes a service valve portion and a pipe bracket that are substantially the same as the service valve portion and pipe bracket shown in the above-mentioned U.S. Pat. No. 3,232,678, and a novel emergency valve portion which is secured to this pipe bracket whereby this emergency valve portion in cooperation with the sevice valve portion and pipe bracket constitute an ungraded brake control valve device.

In the accompanying drawings:

FIG. 1A and FIG. 1B, taken together, constitute a diagrammatic view in section of an improved brake control valve device embodying the invention.

DESCRIPTION

As shown in FIGS. 1A and 1B of the drawings, when the right-hand edge of FIG. 1A is placed along side of the left-hand edge of FIG. 1B, an improved freight car fluid pressure brake apparatus embodying the invention comprises a brake pipe 1 that extends from one end of the car to the other, a brake cylinder 2, an emergency or supplemental reservoir 3, an auxiliary reservoir 4, and a brake control valve device 5 connected to the brake pipe 1 through a combined cut-out cock and centrifugal dirt collector 6 and a branch pipe 7.

The brake control valve device 5 may comprise a pipe bracket 8 having gasket faces 9 and 10 disposed opposite each other, a service or triple valve device or portion 11 and a novel emergency valve device or portion 12.

The service valve portion 11 and pipe bracket 8 shown in FIG. 1B of the drawings may be substantially the same in construction and operation as the service valve portion 7 and pipe bracket 6 shown and described in the above-mentioned U.S. Pat. No. 3,232,678. Since reference may be had to this patent for a complete description of the structure and operation of this service valve portion and pipe bracket, it is deemed unnecessary to describe them in detail herein. Briefly, however, the service valve portion 11 comprises a sectionalized casing 13 between which and a cover member 14, secured thereto by any suitable means (not shown), is the outer periphery of a diaphragm 15 subject opposingly on its opposite sides to brake pipe pressure in a chamber 16 at the upper side of this diaphragm 15, and to the pressure in the auxiliary reservoir 4 connected to a chamber 17 at the lower side of this diaphragm 15 by a pipe and correspondingly numbered passageway 18 that extends through the pipe bracket 8 and the sectionalized casing 13. Operatively connected to the diaphragm 15 is a service graduating valve 19 and service slide valve 20 for respectively controlling the release of fluid under pressure from the brake pipe 1 to a quick service volume 21 and the supply of fluid under pressure from the auxiliary reservoir 4 to the brake cylinder 2 in response to variations in brake pipe pressure, as disclosed in the above-mentioned U.S. Pat. No. 3,232,678.

The novel emergency portion 12 shown in FIG. 1A of the drawings has a sectionalized casing comprising an upper casing section 22, a lower casing section 23 secured thereto by any suitable means (not shown), and a first annular diaphragm 24 that has its outer periphery clamped between these casing section 22 and 23.

The inner periphery of the diaphragm 24 is operatively connected to the lower end of a stem 25 that extends through coaxial bores in a pair of diaphragm follower plates 26 and 27 and is provided with screw threads adjacent its lower end for receiving a nut 28 which serves, when tightened, to force the follower plate 27 against a shoulder 29 on the stem 25 and clamp the inner periphery of the diaphragm between the diaphragm follower plates 26 and 27.

As shown in FIG. 1A, the stem 25 extends upward through a bore 30 provided therefor in the casing section 22 and into a chamber 31 formed by the cooperative relationship of the casing section 22 and a second annular diaphragm 32 the outer periphery of which is clamped between the casing section 22 and a cover member 33 secured to this casing section by any suitable means (not shown).

The inner periphery of the diaphragm 32 is operatively connected to the upper end of the stem 25 in that it is clamped between a pair of diaphragm follower plates 34 and 35 that are provided with coaxial bores through which the stem 25 extends. This stem 25 is provided adjacent its upper end with a second shoulder 36 and external screw threads for receiving a nut 37 which serves, when tightened, to force the follower plate 34 against the shoulder 36 and clamp the inner periphery of diaphragm 32 between the plates 34 and 35.

As may be seen from FIG. 1A, the diaphragm 24 and follower plates 26 and 27 cooperate with the casing sections 22 and 23 to form on the respective opposite sides of this diaphragm a pair of chambers 38 and 39.

The chamber 38 is open to atmosphere via a passageway 40 that extends through the casing sections 22 and 23 and a lower cover member 41 secured to the lower end of the casing section 23 by any suitable means (not shown) and past a dished circular shield 42.

The shield 42 is preferably formed of a resilient material, such as rubber, and is held in place, in which its outer periphery rests against a conical inner surface 43 on cover member 41, by any suitable means, such as, for example, a rivet 44 that extends through a bore in cover member 41.

Likewise, the chamber 31 below the diaphragm 32 is open to atmosphere via a passageway 45 that at one end opens into the chamber 31 and at the other into the passageway 40 which is open to atmosphere, as explained above.

As shown in FIG. 1A, opening into the chamber 39 below the diaphragm 24 is one end of a passageway 46 that extends through the casing section 23 and 22 and at its other end opens into a chamber 47 (FIG. 1B) formed in the pipe bracket 8. Also opening into the chamber 47 is one end of a passageway 48 that is connected to the brake pipe 1 in the manner described in the hereinbefore-mentioned U.S. Pat. No. 3,232,678.

Opening into the passageway 46 intermediate the ends thereof is one end of a passageway 49 that extends through the casing section 22 and at its opposite end opens into a chamber 50 formed between the casing section 22 and cover member 33 which chamber 50, as shown in FIG. 1A, surrounds an annular valve seat 51 and extends to the lower side of a screw-threaded choke 52 carried by this casing section 22.

The choke 52 controls the rate of flow of fluid under pressure from the chamber 50 to a passageway 53 that extends through the cover member 33 and opens into a chamber 54 formed by the cooperative relationship of this cover member 33 with the diaphragm 32 and diaphragm follower plate 35. Also opening into the chamber 54 is one end of a passageway 55 that extends through the cover member 33, casing section 22 and pipe bracket 8 (FIG. 1B) and opens into a quick action chamber 56 formed in this pipe bracket. From the foregoing, it is apparent that the quick action chamber 56 is charged with fluid under pressure from the brake pipe 1 via the choke 52 which in actual practice or, in other words, in heretofore constructed railway freight car brake control valve devices, has a diameter of 0.0200 inch.

As shown in FIG. 1A of the drawings, the casing section 22 embodies therein four identical poppet-type valves 57, 58, 59, and 60.

The poppet-type valve 57 is disposed in a chamber 61 that is formed in the casing section 22 and separated from the atmospheric chamber 31 by a socket head screw-threaded plug 62 that has screw-threaded engagement with screw threads provided therefor in the casing 22. An O-ring seal 63 disposed in a counterbore in the casing section 22 in surrounding relation to the plug 61 and interposed between this casing and plug 60 prevents leakage of fluid under pressure from the chamber 61 to the chamber 31.

A passageway 64 extending though the casing section 22 opens at one end into the chamber 61 and at the other end within the hereinbefore-mentioned annular valve seat 51 against which a check valve 65 is normally biased by a spring 66 interposed between the upper side of this check valve and the cover member 33 to close communication between the passageway 64 and the chamber 50.

As shown in FIG. 1A, a chamber 67 is provided in the casing section 22 intermediate the chambers 61 and 38 and a bore 68 connects these three chambers, it being noted that an annular valve seat 69 surrounds the upper end of this bore 68.

The poppet valve 57 has formed integral with one side thereof a valve stem 70 that extends through the chamber 67 and the bore 68 into the chamber 38 the portion of this stem extending through the chamber 67 and the upper end of the bore 68 being fluted. A resilient annular member 71 constructed of, for example, rubber, is disposed about the stem 70 and bonded to the lower side of the poppet valve 57, and a spring 72 interposed between the plug 62 and the upper side of this poppet valve 57 is effective to normally bias the annular member 71 against the valve seat 69 to close comunication between the chamber 61 and the chamber 67.

Intermediate the fluted portion thereof and its lower end the valve stem 70 is provided with a peripheral annular groove in which is disposed an O-ring seal 73 that forms a seal with the wall surface of the bore 68 to prevent flow of fluid under pressure from the chamber 67 to the chamber 38 which is always open to atmosphere via passageway 40 and past the resilient shield 42.

Since the poppet valves 57, 58, 59 and 60 are identical, the parts of the poppet valves 58, 59 and 60 are denoted by the same reference numeral as the corresponding parts of the poppet type valve 57.

The poppet-type valve 58 is disposed in a chamber 74 that is formed in the casing section 22 and separated from the atmospheric chamber 38 by a socket head screw-threaded plug 75 and an O-ring seal 76.

A passageway 77 extending through the casing sections 22 and 23 opens at one end into the chamber 74 and at the other end into the hereinbefore-mentioned passageway 40 intermediate the ends thereof. Consequently, the chamber 74 is always open to atmosphere via passageways 77 and 40 and past the resilient shield 42.

Between the chamber 74 and the chamber 31 below the diaphragm 31 the casing section 22 has formed therein a chamber 78 which is connected to the chambers 31 and 74 by a bore 79 at the lower end of which is formed an annular valve seat 80.

As shown in FIG. 1A, the valve stem 70 of the poppet-type valve 58 extends through the bore 79 and chamber 78 and into the chamber 31, and a spring 81 interposed between plug 75 and this poppet valve 58 is effective to normally bias the annular member 71 against the valve seat 80 to close communication between chamber 74 and chamber 78 into which opens one end of a passageway 82. This passageway 82 extends through the casing section 22 and at its other end opens into the passageway 55 intermediate the ends thereof. Since the passageway 55 is connected to the quick action chamber 56, it is apparent that fluid under pressure may flow from the quick action chamber 56 to the chamber 78 via passageways 55 and 82.

As may be seen from FIG. 1A, the poppet-type valve 59 is disposed in a chamber 83 that is formed in the casing section 22 on the right-hand side of the stem 25. This chamber 83, like the chamber 74, is separated from the atmospheric chamber 38 by a socket head screw-threaded plug 84 and an O-ring seal 85. A passageway 86 in the casing section 22 opens at one end into the chamber 83 and at its other end into the hereinbefore-mentioned chamber 67.

Also, opening at one end into the chamber 83 is one end of a passageway 87 that extends through the casing section 22 to a gasket face 88 formed on the right-hand end of the casing section 22. A ported gasket 89 is disposed between the gasket face 88 on the casing section 22 and the gasket face 9 (FIG. 1A) on the pipe bracket 8. Consequently, one of the ports in this gasket 89 establishes a communication between the passageway 87 in the casing section 22 and a passageway in the pipe bracket 8 that corresponds to the passageway 72 shown in the hereinbefore-mentioned U.S. Pat. No. 3,232,678. As explained in this patent, fluid under pressure is supplied from the auxiliary reservoir 2 (in the patent) to this passageway 72 (in the patent) whenever a service brake application is effected. Accordingly, it is apparent that, likewise, fluid under pressure is supplied from the auxiliary reservoir 4 (FIG. 1B) to the passageway 87 (FIG. 1A) and chamber 83 by operation of the service portion 11 (FIG. 1B) in response to a reduction of the pressure in the brake pipe 1 at a service rate.

The valve stem 70 of the poppet-type valve 59 is disposed in a bore 90 that extends through the casing 22 from the chamber 83 to the atmospheric chamber 31, and a spring 91 interposed between the plug 84 and this valve 59 is effective to normally bias the annular member 71 of this valve 59 against an annular valve seat 92 to close communication between the chamber 83 and the interior of the bore 90 into which opens intermediate the ends thereof and below the O-ring seal 73 on this valve stem 70 one end of a passageway 93. As shown in FIGS. 1A and 1B, this passageway 93 extends through the casing section 22 and pipe bracket 8 and is connected by a correspondingly numbered pipe to the emergency reservoir 3.

Finally, the fourth poppet-type valve 60 is disposed in still another chamber 94 provided in the casing section 22, this chamber 94 being separated from the atmospheric chamber 38 by a socket head screw-threaded plug 95 and an O-ring seal 96.

As may be seen from FIG. 1A, the valve stem 70 of the poppet type valve 60 is disposed in a bore 97 that extends through the casing section 22 from the chamber 94 to the chamber 31. Opening at the wall surface of the bore 97 intermediate the ends thereof is one end of a passageway 98 that extends through the casing section 22 and opens into the hereinbefore-mentioned passageway 82 intermediate the ends thereof. This passageway 82 is connected to the quick action chamber 56 by the passageway 55. Consequently, when the annular valve member 71 of the poppet-type valve 60 is unseated from a valve seat 99 against the yielding resistance of a spring 100, a communication is established between the passageway 98 and the chamber 94 into which opens one end of a passageway 101. This passageway 101 extends through the casing 22 and has a choke 102 disposed in the other end to restrict the rate of flow of fluid under pressure to the inside of an annular valve seat 103. This choke 102 controls the rate at which fluid under pressure is released from the quick action chamber 56 to atmosphere when a service brake application is effected and in actual practice, as in heretofore constructed railway freight car brake control valve devices, has a diameter of 0.0810 inch, it being understood that when the diameter of this choke 102 is 0.0810 inch, fluid under pressure will be released from the quick action chamber 56 and the chamber 54 above the diaphragm 32 at the same rate as fluid under pressure is being released from the brake pipe 1 and the chamber 39 below the diaphragm 24. Consequently, operation of the emergency portion 12 to effect an emergency brake application is prevented.

As shown in FIG. 1A, a flat resilient diaphragm valve 104 disposed above the annular valve seat 103 has its outer periphery clamped between the casing section 22 and cover member 33 whereby this diaphragm valve 104 constitutes a cut-off valve when deflected downward in a manner hereinafter explained from the position in which it is shown to a position in which it engages the annular valve seat 103 to close communication between the outlet of the choke 102 and a chamber 105 that surrounds the annular valve seat 103. Opening into this chamber 105 is one end of a passageway 106 that extends through the casing sections 22 and 23 and at its other end opens into the hereinbefore-mentioned passageway 77 intermediate the ends thereof. Since this passageway 77 is connected to the passageway 40 which is open to atmosphere via the shield 42, it is apparent that the chamber 105 is constantly open to atmosphere via passageways 106, 77 and 40.

In order to effect seating of diaphragm cut-off valve 104 on annular valve seat 103, a diaphragm follower member 107 is interposed between the upper side of this cut-off valve 104 and the lower side of a flat flexible operating diaphragm 108 the outer periphery of which is clamped between the cover member 33 and a cap member 109 that is secured to this cover member 33 by any suitable means (not shown).

The cap member 109 cooperates with the upper side of the operating diaphragm 108 to form a chamber 110 into which opens one end of a passageway 111 that extends through the cap member 109, cover member 33 and casing section 22 and at its other end opens into the hereinbefore-mentioned passageway 77 intermediate the ends thereof.

In the event that the pressure in the quick action chamber 56 becomes higher than that in the emergency reservoir 3, a check valve device 112 is provided. As shown in FIG. 1A, this check valve device 112 comprises an annular valve seat 113 against which a flat disc valve 114 is normally biased by a spring 115 that is interposed between this disc valve 114 and the cover member 33. Opening within the annular valve seat 113 is one end of a passageway 116 that extends through the casing section 22 and at its opposite end opens into the hereinbefore-mentioned passageway 55. A choke 117 is disposed in this passageway 116 to control the rate of flow of fluid under pressure from the passageway 55 to a chamber 118 above the disc valve 114 into which chamber 118 opens one end of a passageway 119 that extends through the casing section 22 and at its other end opens into the hereinbefore-mentioned passageway 93 that is connected to the emergency reservoir 3 by the correspondingly numbered pipe, as shown in FIG. 1B.

Contained within the casing sections 22 and 23 of the novel emergency portion 12 shown in FIG. 1A is an inshot valve mechanism 120 which is operative, when effecting an emergency application of the brakes, to provide an initial inshot of fluid under pressure to the brake cylinder 2 (FIG. 1B) until a predetermined brake cylinder pressure (about 15 pounds per square inch) is developed and to then restrict the rate of flow of fluid under pressure to the brake cylinder 2.

The inshot mechanism 120 (FIG. 1A) comprises a flat diaphragm valve 121 the outer periphery of which is clamped between the casing sections 22 and 23 whereby these casing sections cooperate with this diaphragm valve 121 to form on the respective upper and lower sides thereof a pair of chambers 122 and 123.

In the absence of fluid under pressure in the chambers 123 and 126, the diaphragm valve 121 is normally unseated from on an annular valve seat 124 formed on the casing section 22. The chamber 122 outside the annular valve seat 124 is constantly connected to the brake cylinder 2 (FIG. 1B) by a passageway 125 that extends through the casing section 22 and pipe bracket 8 and a correspondingly numbered pipe.

While the diaphragm valve 121 is seated on the valve seat 124, a chamber 126, which is connected by a short passageway 127 to the hereinbefore-mentioned passageway 87, is open to the chamber 122 outside this valve seat 124 through a screw-threaded choke 128 which is removably mounted in a wall 129 that separates chamber 126 from chamber 122. The choke 128 is readily accessible for removal, replacement and cleaning subsequent to separating the casing sections 22 and 23 and removal of the diaphragm valve 121.

Moreover, in actual practice, as in heretofore constructed railway freight car brake control valve devices, the choke 128 has a diameter of 0.09375 inch.

The chamber 123 below the diaphragm valve 121 is connected by a passageway 130 extending through the casing section 23 to a chamber 131 formed by the cooperative relationship of the casing sections 22 and 23. Formed in the casing section 22 is a volume chamber 132 that is connected to the chamber 131 by a short passageway 133. In actual practice, as in heretofore constructed railway freight car brake control valve devices, the volume chamber 132 has a cubic capacity of fifteen cubic inches.

As shown in FIG. 1A, the chamber 131 is connected to the passageway 77 on the upper side of a choke 134 in this passageway 77 by a passageway 135 that has disposed therein adjacent the chamber 131 a choke 136. In actual practice, as in heretofore constructed railway freight car brake control valve devices, the choke 134 has a diameter of 0.0200 inch and the choke 136 has a diameter of 0.1285 inch.

Referring to FIG. 1A, it will be noted that the cover member 33 is provided with a bore 137 that is coaxial with the bore 30 in the casing section 22 and three coaxial counterbores 138, 139 and 140 this latter counterbore 140 being provided with internal screw threads. An O-ring seal 141 is retained in the counterbore 139 by a screw-threaded plug 142 having screw-threaded engagement with the screw-threaded counterbore 140, and a cup-shaped piston 143 slidably mounted in the counterbore 138 is normally biased against a shoulder 144 formed by the lower end of this counterbore 138 by a spring 145 interposed between this piston 143 and the plug 142. This spring 145 and piston 143 yieldingly resists upward deflection of the diaphragms 32 and 24 in a manner hereinafter described.

The emergency valve device 12 shown in FIG. 1A further comprises a brake pipe vent valve device 146 for effecting a rapid release of fluid under pressure from the brake pipe 1 to atmosphere whenever an emergency brake application is effected.

As shown in FIG. 1A, the lower cover member 41 is provided on its upper side with an annular valve seat 147 and cooperates with the casing section 23 to form on the outside of this valve seat 147 an annular chamber 148 into which opens one end of a passageway 149. This passageway 149 extends through the casing sections 23 and 22 to the gasket face 88 on the casing section 22 where it registers with a port in the ported gasket 89. This port in the gasket 89 establishes a communication between the passageway 149 in the casing section 22 and a passageway in the pipe bracket 8 that corresponds to the passageway 37 shown in the hereinbefore-mentioned U.S. Pat. No. 3,232,678. As shown in FIG. 1 of this patent, fluid under pressure is supplied from the brake pipe to this passageway 37 (in the patent). Accordingly, it is apparent that fluid under pressure is supplied from the brake pipe 1 to the passageway 149 (FIG. 1A) and the chamber 148.

Referring to FIG. 1A, it will be noted that the casing section 23 is provided with a bore 150 that at its upper end opens into the hereinbefore-mentioned chamber 39 and at its lower end into a coaxial counterbore 151 the lower end of which opens into the chamber 148.

Slidably mounted in the bore 150 is a fluted valve stem 152 that at its lower end is integral with a poppet-type valve 153 that has a resilient annular valve member 154 bonded thereto in surrounding relation to the valve stem 152, and slidably mounted in the counterbore 151 is a cup-shaped vent valve guide 155. A vent valve 156 constructed of some resilient material, such as, for example, rubber, is clamped to the valve guide 155 by a washer 157 and a cap screw 158. The annular valve member 154 is normally maintained seated on an annular valve seat 159 formed on the casing section 23 at the lower end of the bore 150 by a spring 160 that is interposed between the poppet valve 153 and the vent valve guide 155. This spring 160, together with a spring 161 that is interposed between the casing section 23 and the vent valve guide 155 in surrounding relation to the spring 160, is effective to normally bias the vent valve 156 against the valve seat 147 to close communication between the chamber 148 and atmosphere via the shield 42.

As shown in FIG. 1A, the vent valve guide 155 is provided with a small port or choke 162 through which fluid under pressure may flow at a restricted rate from the chamber 148 to the upper side of the vent valve 156 and vent valve guide 155.

It will be noted from FIG. 1A that the bore 150 intersects the passageway 77 and that the valve stem 152 is provided with a peripheral annular groove in which is disposed an O-ring seal 163 that forms a seal with the wall surface of the bore 150 to prevent leakage of fluid under pressure from the chamber 39 into the passageway 77 which is open to atmosphere via passageway 40 and past the shield 42.

From the foregoing, it is apparent that when the annular valve member 154 is unseated from valve seat 159 in a manner hereinafter explained, fluid under pressure will flow from the upper side of the vent valve 156 and valve guide 155 to atmosphere past the valve seat 159, bore 150, passageways 77 and 40 and past the shield 42 faster than fluid under pressure can flow from the chamber 148 through the choke 162. Consequently, the fluid under pressure in the chamber 148 will unseat the vent valve 156 from its seat 147. With the vent valve 156 thus unseated, fluid under pressure will flow from the brake pipe 1 to atmosphere via cut-out cock and dirt collector 6, passageway 149, chamber 148, and thence past valve seat 147 and shield 42 at an emergency rate to cause an emergency brake application in a manner hereinafter described.

OPERATION

Initial Charging

Let it be assumed that a railway freight car provided with the brake control valve device 5 shown in FIGS. 1A and 1B of the drawings has been coupled into a train of cars, and that a handle of an engineer's brake valve device (not shown) located on the locomotive coupled to the head end of the train is in its release position. Therefore, while the handle of the engineer's brake valve device is in its release position, this brake valve device will effect the supply of fluid under pressure to the train brake pipe and therefore to the brake pipe 1 to charge the train brake pipe to a preselected normal charged value which, for example, may be seventy pounds per square inch.

Fluid under pressure supplied to the brake pipe 1 will flow via the branch pipe 7 and combined cut-out cock and dirt collector 6 to the brake control valve device 5 to cause the service valve portion 11 of this control valve device 5 to operate in the usual well-known manner of railway freight car brake control valves to effect a release of fluid under pressure from the brake cylinder 2 thereby releasing the brakes on the car and to charge the emergency reservoir 3 and auxiliary reservoir 4 to the pressure carried in the brake pipe 1.

Fluid under pressure supplied to the brake pipe 1 will flow therefrom to, (1) the chamber 148 via the passageway 149, (2) the chamber 39 via the passageway 46, and (3) the chamber 50 via the passageways 46 and 49.

Fluid under pressure thus supplied to the chamber 50 flows therefrom to the chamber 54 above diaphragm 32 via the choke 52 and passageway 53 at a restricted rate determined by the size of the choke 52. Fluid under pressure thus supplied to the chamber 54 flows therefrom to the quick action chamber 56 (FIG. 1B) via the passageway 55 to effect the charging thereof to the normal pressure carried in the brake pipe 1.

It will be noted from FIG. 1A that some of the fluid under pressure supplied to the passageway 55 flows therefrom to, (1) the interior of the bore 79 via passageway 82 and (2) the interior of the bore 97 via the passageways 82 and 98.

Since the choke 52 restricts the rate of flow of fluid under pressure from the brake pipe 1 to the chamber 54 above the diaphragm 32, the unrestricted flow of fluid under pressure from the brake pipe 1 to the chamber 39 below the diaphragm 24 will cause the pressure to increase in the chamber 39 faster than in the chamber 54 above the diaphragm 32. Consequently, it is apparent that a differential fluid pressure force is established which acts in an upward direction to thereby deflect the diaphragms 24 and 32 upward and shift the diaphragm follower plates 26, 27, 34 and 35, valve stem 25 and piston 143 upward against the yielding resistance of the spring 145.

As the diaphragm follower plate 27 is thus shifted upward, it will first abut the lower end of the stem 70 of the poppet-type valve 57 and thereafter unseat the annular valve member 71 of this valve 57 from its seat 69.

Assuming that no fluid under pressure is present in the brake cylinder 2 (FIG. 1B) at the time the freight car is coupled into the train, there is no flow of fluid under pressure from this brake cylinder 2 to the brake pipe 1 upon unseating of the valve member 71 from the seat 69.

Subsequent to the pressure in the chamber 39 reaching the normal fully charged brake pipe pressure, the continued flow of fluid under pressure to the chamber 54 via the choke 52 will cause the pressure in this chamber 54 to increase to that in the chamber 39.

As the pressure in the chamber 54 is thus increased to that in the chamber 39, the spring 145 is rendered effective to shift the piston 143, stem 25, diaphragm follower plates 26, 27, 34 and 35 and diaphragms 32 and 24 downward until they are returned to the position in which they are shown in FIG. 1A.

As the diaphragm follower plate 27 is thus shifted downward, the spring 72 is rendered effective to seat annular valve member 71 of the poppet valve 57 on its seat 69.

SERVICE APPLICATION

A service application of the brakes is initiated by effecting a gradual reduction in brake pipe pressure at a service rate in the usual well-known manner. The service portion 11 (FIG. 1B) of the brake control valve device 5 will operate in the usual manner of the service portion of heretofore known railway freight car brake control valve devices to effect the supply of fluid under pressure from the auxiliary reservoir 4 to the brake cylinder 2 to cause a service brake application on the freight car provided with the control valve device 5.

As the pressure in the brake pipe 1 is reduced at a service rate, the pressure in the chamber 39 below the diaphragm 24 will be correspondingly reduced at a service rate.

Since the choke 52 restricts the rate of flow of fluid under pressure from the chambers 54 and 56 to the brake pipe 1, it is apparent that as the pressure in the chamber 39 below the diaphragm 24 is thus reduced faster than the pressure in the chamber 54 above the diaphragm 32, a differential fluid pressure force is established which acts in a downward direction to deflect diaphragms 32 and 24 downward and thereby effect shifting of stem 25 and diaphragm follower plates 26, 27, 34 and 35 downward.

As the diaphragm follower plate 34 is thus shifted downward, it will first abut the upper end of valve stem 70 of poppet valve 60 and thereafter shift this stem 70 downward to unseat annular valve member 71 of this poppet valve 60 from its seat 99. It should be noted that this valve member 71 of the poppet valve 60 is unseated from its seat 99 without the diaphragm follower plate 34 effecting unseating of the valve member 71 of the poppet valves 58 and 59 from their seats 80 and 92 or the stem 25 effecting unseating of the annular valve member 154 of poppet valve 153 from seat 159.

Upon the unseating of the annular valve member 71 of the poppet valve 60 from its seat 99, fluid under pressure will flow from the chamber 54 above diaphragm 32 and the quick action chamber 56 to atmosphere via passageways 55, 82, and 98, bore 97, past valve seat 99, chamber 94, passageway 101, choke 102, past valve seat 103, chamber 105, passageways 106, 77 and 40 and thence past shield 42 at a rate determined by the size of the choke 102.

As hereinbefore stated, this choke 102 has a diameter of 0.0810 inch which diameter enables fluid under pressure to be released from the chamber 54 above diaphragm 32 and quick action chamber 56 to atmosphere at the same rate as fluid under pressure is being released from the chamber 39 below the diaphragm 24. This enables the pressure differential on the diaphragms 32 and 24 to be substantially destroyed so that these diaphragms are not further deflected in a downward direction.

SERVICE LAP

When the release of fluid under pressure from the brake pipe is terminated, the release of fluid under pressure from the chamber 39 is likewise terminated.

As the flow of fluid under pressure from the chamber 54 and quick action chamber 53 to atmosphere continues, a differential fluid pressure force is established on the diaphragms 24 and 32 which acts in an upward direction. Consequently, these diaphragms 24 and 32 are deflected in an upward direction to shift the stem 25 and diaphragm follower plates 26, 27, 34 and 35 upward.

As the diaphragm follower plate 34 is thus shifted upward from the stem 70 of the poppet valve 60, the spring 100 is rendered effective to seat the annular valve member 71 of this poppet valve 60 on its seat 99 thereby terminating further flow of fluid under pressure from the chamber 54 and quick action chamber 56 to atmosphere.

When the release of fluid under pressure from the brake pipe 1 is terminated, the service valve device 11 will move to a lap position to cut off flow of fluid under pressure from the auxiliary reservoir 4 to the brake cylinder 2.

EMERGENCY APPLICATION

To effect an emergency application of the brakes, fluid under pressure is suddenly vented at a rapid rate from the brake pipe 1. Upon this reduction of pressure in the brake pipe 1, the service valve device 11 will operate to supply fluid under pressure from the auxiliary reservoir 4 (FIG. 1B) to the passageway 87 (FIG. 1A).

Moreover, the emergency valve device 12 operates in the manner explained above to release fluid under pressre from the chamber 54 and quick action chamber 56 to atmosphere via the choke 102. This rate of release of fluid under pressure from the chamber 54 above the diaphragm 32 is less than the emergency rate of release of fluid under pressure from the chamber 39 below the diaphragm 24 via the brake pipe 1.

Therefore, it is apparent that a differential of pressure is quickly established on the diaphragms 32 and 24 which acts in a downward direction to deflect these diaphragms downward and thereby shift the stem 25 and diaphragm follower plates 26, 27, 34 and 35 downward.

As the stem 25 is thus further shifted in a downward direction, the lower end thereof will first abut the upper end of the stem 152 and thereafter, via this stem 152, effect unseating of the annular valve member 154 of the poppet valve 153 from its seat 159.

Upon this unseating of the annular valve member 154, fluid under pressure will flow from the upper side of the vent valve guide 155 to atmosphere via bore 150, passageways 77 and 40 and past shield 42 faster than fluid under pressure can blow from the chamber 148 through the choke 162. Consequently, the fluid under pressure in the chamber 148 will move the valve guide 155 and vent valve 156 upward from valve seat 147.

When the vent valve 156 is thus unseated from its seat 147, the brake pipe passageway 149 is open to atmosphere via chamber 148, past valve seat 147 and shield 42. With this communication established, fluid under pressure is suddenly vented from the brake pipe 1 at an emergency rate for the purpose of serially transmitting an emergency rate of reduction of pressure in the train brake pipe extending through the train in the usual well-known manner.

As the diaphragm follower plate 34 is further shifted downward along with the stem 25, this plate 34 simultaneously abuts the upper end of the stem 70 of the poppet valves 58 and 59 and thereafter, via these stems, unseats the corresponding annular valve member 71 from the respective valve seats 80 and 92.

Upon unseating of the annular valve member 71 of the poppet valve 59 from its seat 92, fluid under pressure will flow from the emergency reservoir 3 (FIG. 1B) to the passageway 87 (FIG. 1A) via pipe and passageway 93 (FIGS. 1B and 1A), bore 90 (FIG. 1A), past valve seat 92 and chamber 83.

The fluid under pressure thus supplied to the passageway 87 from the emergency reservoir 3 combines with that supplied to this passageway 87 from the auxiliary reservoir 4 by operation of the service valve device 11 and flows therefrom to the chamber 126 in the inshot mechanism 120 via the passageway 127.

Fluid under pressure thus supplied to the chamber 126 will flow from the chamber 126 past the valve seat 124 to the chamber 122 above the diaphragm valve 121.

Moreover, fluid under pressure will flow from the chamber 126 to the chamber 122 via the choke 128. The fluid under pressure thus supplied to the chamber 122 flows therefrom to a pressure chamber (not shown) within the brake cylinder 2 (FIG. 1B) via the passageway and corresponding pipe 125.

The fluid under pressure thus supplied to the pressure chamber within cylinder 2 will act on one side of the piston (not shown) therein and move this piston outward against the yielding resistance of the brake cylinder release spring (not shown) that acts on the other side of this piston. As this piston is thus moved, it increases the volume of the pressure chamber to which fluid under pressure is being supplied from the chamber 122 (FIG. 1A). It is apparent that this increasing volume of the pressure chamber within the brake cylinder 2 (FIG. 1B) retards the rate of build up of pressure in this pressure chamber of increasing volume and also in the chamber 122 (FIG. 1A) above the diaphragm valve 121.

Upon the unseating of the annular valve member 71 of the poppet valve 58 from its seat 80, fluid under pressure will flow from the chamber 54 and quick action chamber 56 to the chamber 110 above the diaphragm 108 via the passageways 55 and 82, bore 79, past valve seat 80, chamber 74, passageway 77 and passageway 111.

Fluid under pressure thus supplied to the chamber 110 is effective to deflect the diaphragm 108 downward and, via the diaphragm follower member 107, force the diaphragm cut-off valve 104 against the valve seat 103.

When the diaphragm cut-off valve 104 is thus forced against the seat 103, flow of fluid under pressure from the quick action chamber 56 and chamber 54 to atmosphere via passageways 55, 82 and 98, bore 97, past valve seat 99, chamber 94, passageways 101 and choke 102 is cut off.

However, fluid under pressure will continue to flow from the quick action chamber 56 and chamber 54 to atmosphere via passageways 55 and 82, bore 79, past valve seat 80, chamber 74, passageway 77 and choke 134 disposed therein, the bore 150, passageway 40 and past the shield 42.

Since the choke 134 restricts the flow of fluid under pressure through the passageway 77, some of the fluid under pressure supplied to the passageway 77 upstream of this choke 134 will flow to the chamber 123 below diaphragm valve 121 via the passageway 135, choke 136, chamber 131, and passageway 130 at a rate determined by the size of the choke 136.

It may be seen from FIG. 1A that some of the fluid under pressure supplied to the chamber 131 flows therefrom to the volume chamber 132 via the passageway 133. The volume of this chamber 132, which, as aforestated, is 15 cubic inches, and the diameter of the chokes 134 and 136 which, as aforestated, are respectively 0.0200 inch and 0.1285 inch, are such that when the pressure in the pressure chamber within the brake cylinder 2 (FIG. 1B) has increased to 15 pounds per square inch, the pressure in the chamber 123 (FIG. 1A) below the diaphragm valve 121 will be of sufficient value to deflect this diaphragm valve 121 in an upward direction until it seats on the annular valve seat 124 thereby closing off the rapid flow of fluid under pressure to the brake cylinder 2 by way of the annular valve seat 124. With the diaphragm valve 121 thus seated on valve seat 124, fluid under pressure continues to flow from the chamber 126 to the brake cylinder 2 (FIG. 1B) via the choke 128 (FIG. 1A), chamber 122 and passageway and pipe 125 (FIG. 1B), the choke 128 forming a by-pass communication around the diaphragm valve 121 which is now seated on the valve seat 124. The choke 128 provides for the second stage of increase in brake cylinder pressure at a slower rate. The pressure in the brake cylinder 2 will now continue to build up at this slower rate determined by the size of the choke 128 until equalization of the pressure in the auxiliary reservoir 4, emergency reservoir 3 and brake cylinder 2 occurs.

From the foregoing, it is apparent that the emergency valve device 12 of the brake control valve device 5 provides a two-stage buildup of pressure in the brake cylinder 2.

Referring now to FIG. 1A, it will be seen that the fluid under pressure in the volume reservoir 132 and the chamber 123 below the diaphragm valve 121 can flow to atmosphere via passageways 133 and 130, chamber 131, choke 136, passageways 135 and 77, choke 134, bore 150, passageway 40 and past shield 42 at a rate determined by the size of the chokes 136 and 134. As hereinbefore stated, the volume reservoir 132 has a capacity of fifteen cubic inches, and the diameters of the chokes 136 and 134 are 0.1285 inch and 0.0200 inch respectively. With the reservoir 132 thus having a volume of fifteen cubic inches and the chokes 136 and 134 having a diameter of 0.1285 inch and 0.0200 inch respectively, the pressure in the volume reservoir 132 and the chamber 123 below the diaphragm valve 121 will be reduced to atmospheric pressure at substantially the same time that equalization of the pressures in the auxiliary reservoir 4, emergency reservoir 3 and the brake cylinder 2 occurs. Therefore, there is no further increase in brake cylinder pressure subsequent to the pressure in the chamber 123 being reduced to atmospheric pressure.

Since fluid under pressure is supplied from both the auxiliary reservoir 4 and the emergency reservoir 3 to the brake cylinder 2 when an emergency brake application is effected, it is apparent that a higher pressure is obtained in the brake cylinder 2 than is the case when a service brake application is effected.

When all fluid under pressure is released from the quick action chamber 56 and the brake pipe 1 and, therefore, from the chambers 54 and 39, the valve stem 25, diaphragms 32 and 24 and diaphragm follower plates 26, 27, 34 and 35 will return to the position shown in FIG. 1A.

RELEASE OF THE BRAKES AFTER AN EMERGENCY APPLICATION

To effect a release of the brakes after an emergency application, fluid under pressure is supplied to the brake pipe 1 from whence it flows to the chamber 39 (FIG. 1A) below the diaphragm 24 in the emergency valve device 12 and the chamber 50 below the choke 52 in this valve device 12.

Moreover, fluid under pressure flows from the brake pipe 1 to the chamber 16 (FIG. 1B) above the diaphragm 15 in the service valve device 11 at a restricted rate determined by the size of a choke 164.

It will be noted from FIGS. 1A and 1B of the drawings that fluid under pressure flows at an unrestricted rate to the chambers 39 and 50 in the emergency valve device 12 since there are no chokes in the passageways 46 and 49.

Furthermore, it will be noted from FIG. 1A that the choke 52 restricts the rate of flow of fluid under pressure from the chamber 50 to the chamber 54 above the diaphragm 32 and the quick action chamber 56 via passageways 53 and 55. Accordingly, it is apparent that the pressure in the chamber 39 below the diaphragm 24 will increase more rapidly than will the pressure in the chamber 54 above the diaphragm 32.

Accordingly, it is apparent that the more rapid rate of increase of pressure in the chamber 39 quickly establishes a fluid pressure differential force which is effective to deflect the diaphragms 24 and 32 in an upward direction, as viewed in FIG. 1A.

Moreover, it is apparent that this upward deflection of the diaphragms 24 and 32 is effective to shift the valve stem 25, diaphragm follower plates 26, 27, 34 and 35, and piston 143 in an upward direction against the yielding resistance of the spring 145 until the diaphragm follower plate 35 abuts a stop surface 165 on the lower side of cover member 33.

As the diaphragm follower plate 34 is thus shifted upward, (1) spring 81 is rendered effective to seat annular valve member 71 of poppet valve 58 on its seat 80 thereby closing communication between chambers 54 and 56 and atmosphere, (2) spring 91 is rendered effective to seat annular valve member 71 of poppet valve 59 on its seat 92 to close communication between the emergency reservoir 3 and the brake cylinder 2, and (3) spring 100 is rendered effective to seat annular valve member 71 of poppet valve 60 on its seat 99 to close communication between chambers 54 and 57 and chamber 94 into which opens the passageway 101 that has choke 102 therein.

Likewise, as the valve stem 25 is shifted upward, the spring 160 is rendered effective to seat annular valve member 154 of poppet valve 153 on its seat 159 thereby closing communication between the interior of counterbore 151 and atmosphere.

Subsequent to the seating of annular valve member 154 on its seat 159, fluid under pressure supplied from the brake pipe 1 to the chamber 148 via branch pipe 7, cut-out cock and dirt collector 6, and passageway 149, and thence via the choke 162 to the upper side of the vent valve guide 155 will be retained within counterbore 151. Upon equalization of the pressures in chamber 148 and on the upper side of the vent valve guide 155, the spring 161 is rendered effective to seat brake pipe vent valve 156 on its seat 147 thereby cutting off flow of fluid under pressure from the chamber 148 and the brake pipe 1 to atmosphere past the shield 42.

As the diaphragm follower plate 27 is moved upward by the upward deflection of the diaphragms 24 and 32, subsequent to the seating of the annular valve members 71 of the poppet valves 58, 59 and 60 on their respective valve seats 80, 92 and 99 in the manner described above, this follower plate 27 will first abut the lower end of the valve stem 70 of the poppet valve 57 and thereafter lift the annular valve member 71 of this valve 57 from its seat 69 against the yielding resistance of the spring 72.

Since the pressure in the chamber 123 has been reduced to atmospheric pressure, as hereinbefore explained, brake cylinder pressure present in chamber 122, which is connected to the brake cylinder 2 (FIG. 1B) by the passageway and pipe 125, will now deflect diaphragm valve 121 (FIG. 1B) downward away from the valve seat 124 whereupon fluid under pressure will flow from the brake cylinder 2 (FIG. 1B), and the auxiliary reservoir 4 connected thereto via the service valve device 11 which is still in its service application position to the brake pipe 1 via pipe and passageway 125, chamber 122 (FIG. 1A), past valve seat 124 and through choke 128, chamber 126, passageway 127 and 87, chamber 83, passageway 86, chamber 67, bore 68, past valve seat 69, chamber 61, passageway 64, past valve seat 51, check valve 65 being unseated against the yielding resistance of the spring 66, chamber 50, passageway 49, passageway 46, chamber 47 (FIG. 1B), passageway 48, a strainer device 166 and a passageway 167 in the pipe bracket 8, combined cut-out cock and dirt collector 6 and branch pipe 7.

The above-mentioned flow of fluid under pressure from the brake cylinder 2 and auxiliary reservoir 4 to the brake pipe 1 accelerates the rate of recharge of the brake pipe. This action naturally occurs firat at the head end of the train when the increase in brake pipe pressure is first effected, and the sudden increase in brake pipe pressure on one car causes the emergency valve device on the next car to functon in the same manner, so that this back dump operation is rapidly transmitted serially from car to car throughout the length of the train.

It will be noted from FIG. 1A that some of the fluid under pressure supplied from the brake cylinder 2 and auxiliary reservoir 4 to the chamber 50, in the manner described above, flows from this chamber 50 to the chamber 54 above the diaphragm 32 via the choke 52 and passageway 53.

Moreover, fluid under pressure thus supplied to the chamber 54 flows therefrom to the quick action chamber 56 via the passageway 55.

From the foregoing, it is apparent that fluid under pressure will flow from the brake cylinder 2 and auxiliary reservoir 4 to the brake pipe 1 until substantial equalization of pressures therebetween occurs, and also that fluid under pressure will flow through the choke 52 until the pressure in the chamber 54 and quick action chamber 56 is substantially the same as the pressure in the chamber 39 and the brake pipe 1.

As the pressure in the chamber 54 above the diaphragm 32 is increased by flow of fluid under pressure to this chamber through the choke 52, the differential fluid pressure force acting upward on the diaphragms 24 and 32 is correspondingly reduced. Therefore, as this differential fluid pressure force is thus reduced, the spring 145 is rendered effective via the piston 143 to shift the valve stem 25 and diaphragm follower plates 26, 27, 34 and 35 downward until the piston 143 abuts the shoulder 144.

Upon equalization of pressure in chambers 54 and 39, the inherent resilience of the diaphragms 32 and 24 return these diaphragms, the stem 25 and the diaphragm follower plates 26, 27, 34 and 35 to the piston in which they are shown in FIG. 1A.

As the diaphragm follower plate 27 is thus moved downward to the piston in which it is shown in FIG. 1A, the spring 72 is rendered effective to seat annular valve member 71 of the poppet-type valve 57 on its seat 69 thereby closing communication between the brake cylinder 2 (FIG. 1B) and the brake pipe 1 thereby preventing further flow of fluid under pressure from the brake cylinder 2 to the brake pipe 1.

As fluid under pressure is supplied to the chamber 16 (FIG. 1B) in the manner described above, the resulting increase in pressure in this chamber 16 will deflect the diaphragm 15 downward to thereby return the graduating valve 19 and the service valve 20 of the service valve device 11 to the position shown. The fluid under pressure now remaining in the brake cylinder 2 will flow to atmosphere via pipe and passageway 125, chamber 122, past valve seat 124, choke 128 in parallel therewith, chamber 126, passageways 127 and 87, and passageways and ports in the service valve device 11 it being understood that these passageways and ports correspond to ports and passageways in the service valve device 7 of the brake control valve device 1 shown in hereinbefore-mentioned U.S. Pat. No. 3,232,678 through which fluid under pressure may flow from the brake cylinder 7 shown in this patent to atmosphere.

With the release of all fluid under pressure from the brake cylinder 2 (FIG. 1A), the brakes on the car will be completely released.

Furthermore, the emergency reservoir 3 and the auxiliary reservoir 4 will now be charged from the brake pipe 1 to the normal fully charged train brake pipe pressure.

Having now described the invention, what I claim as new and desire to secure by Letters Patent, is:

1. For use in a brake apparatus including a brake pipe, an auxiliary reservoir and an emergency reservoir each normally charged to a certain chosen pressure, a brake cylinder and a fluid-pressure-operated service valve device, a fluid-pressure-operated emergency valve device operative in conjunction with said service valve device in response to a reduction of the pressure in the brake pipe at an emergency rate to effect the supply of fluid under pressure from said reservoirs to said brake cylinder to cause an emergency brake application and comprising:

a. a casing having therein a plurality of chambers, bores and passageways, one of said bores and one of said passageways cooperating to provide a communication through which fluid under pressure may be released from another chamber other than said plurality of chambers to atmosphere via one of said plurality of chambers, said one bore having at one end an annular valve seat, and one end of said passageways opening into said chambers and bores and the other end being connected respectively to the brake pipe, the emergency reservoir and said another chamber, b. a plurality of poppet-type valves for controlling flow between said chambers and passageways, a first one of said poppet-type valves cooperating with said annular valve seat to control flow between said another chamber and said one of said plurality of chambers, c. movable abutment means subject respectively to pressure in the brake pipe and in said another chamber, the deflection of said abutment means in one direction responsive to a reduction of the pressure in the brake pipe being effective to cause said abutment means to operate said first one of said plurality of poppet-type valves to release fluid under pressure from said another chamber to atmosphere and a second one of said poppet-type valves to effect the supply of fluid under pressure from the emergency reservoir to the brake cylinder, and the deflection of said abutment means in an opposite direction responsive to a subsequent increase of the pressure in the brake pipe being effective to cause said abutment means to operate a third one of said poppet-type valves to effect the supply of fluid under pressure from the brake cylinder to the brake pipe, d. resilient means effective to yieldingly resist deflection of said abutment means in said opposite direction, said resilient means being effective to subsequently deflect said abutment means in said one direction responsive to the pressure in said another chamber increasing to that in the brake pipe, e. a first means enabling said first one of said plurality of poppet-type valves to release fluid under pressure from said another chamber to atmosphere at a chosen rate in response to the release of fluid under pressure from the brake pipe at said chosen rate, f. a first fluid-pressure-operated means for rendering said first enabling means ineffective to release fluid under pressure from said another chamber at said chosen rate, g. a second means enabling a fourth one of said plurality of poppet-type valves to effect the supply of fluid under pressure from said another chamber to said first fluid-pressure-operated means in response to the release of fluid under pressure from the brake pipe at a rate in excess of said chosen rate, and h. a third means enabling the release of fluid under pressure from said first fluid-pressure-operated means to atmosphere at a rate different than said chosen rate.

2. A fluid-pressure-operated emergency valve device, as recited in claim 1, further characterized in that said movable abutment means comprises a pair of spaced-apart and interconnected movable abutments between which said plurality of poppet-type valves are so disposed that a fluted stem of said first one of said poppet-type valves is engaged by one of said abutments to effect unseating of said first one poppet-type valve to cause the release of fluid under pressure from said another chamber to atmosphere in response to a first chosen degree of deflection of said abutments in said one direction, that a fluted stem of two other of said poppet-type valves is engaged by said one of said abutments to effect unseating thereof to cause, respectively, further release of fluid under pressure from said another chamber to atmosphere, and the supply of fluid under pressure from the emergency reservoir to the brake cylinder in response to a degree of deflection of said abutments that is in excess of said first chosen degree, and that a fluted stem of said third one of said poppet-type valves is engaged by the other of said pair of abutments to effect unseating thereof to cause flow of fluid under pessure from the brake cylinder and the auxiliary reservoir to the brake pipe in response to a chosen degree of deflection of said abutments in said opposite direction.

3. A fluid-pressure-operated emergency valve device, as recited in claim 1, further comprising:

a. a first choke means controlling flow of fluid under pressure from the brake pipe to said another chamber, b. a pair of choke means other than said first choke means, one of which is so arranged that fluid under pressure may be released therethrough from said another chamber to atmosphere in response to operation of said first one of said poppet-type valves, and the other of which is so arranged that fluid under pressure may be released therethrough from said another chamber to atmosphere in response to operation of said fourth one of said poppet-type valves, c. said first fluid-pressure-operated means operated by fluid under pressure released from said another chamber in response to operation of said fourth poppet-type valve to cut off the release of fluid under pressure from said another chamber to atmosphere via said one choke means of said pair of choke means, d. a normally closed valve past which fluid under pressure may flow to the brake cylinder, e. a fourth choke means, other than said first choke means and said pair of choke means arranged in by-passing relation with said normally closed valve, f. a second fluid-pressure-operated means for maintaining said valve closed, and g. a fifth choke means for controlling the supply of the fluid under pressure released from said another chamber, in response to operation of said fourth poppet-type valve, to said second fluid-pressure-operated means, said fifth choke means being of such a size as to, in series relation with said other of said pair of choke means, release fluid under pressure from said second fluid-pressure-operated means to atmosphere at such a rate that said valve is maintained closed until equalization of pressure occurs between said reservoirs and said brake cylinder whereby a two-stage buildup of pressure in said brake cylinder is obtained.

4. A fluid-pressure-operated emergency valve device, as recited in claim 1, further characterized in that said first means enabling said first one of said plurality of poppet-type valves to release fluid under pressure from said another chamber to atmosphere comprises a choke of such size as to release fluid under pressure from said another chamber to atmosphere at a service rate, and said first fluid-pressure-operated means comprises:

a. an annular valve seat, b. a diagram valve movable into engagement with said annular valve seat, c. an operating diaphragm to one side of which fluid under pressure may be supplied from said another chamber in response to operation of said fourth poppet-type valve, and d. a diaphragm follower interposed between the other side of said operating diaphragm and said diaphragm valve through which force is transmitted from said operating diaphragm to said diaphragm valve to effect seating thereof on said annular valve seat.

* * * * *

UNITED STATES PATENT AND TRADEMARK OFFICE
CERTIFICATE OF CORRECTION

PATENT NO. : 4,045,095
DATED : August 30, 1977
INVENTOR(S) : Fred Temple

It is certified that error appears in the above-identified patent and that said Letters Patent are hereby corrected as shown below:

Column 18, line 56, "diagram" should be --diaphragm--

Signed and Sealed this

Twenty-fifth Day of April 1978

[SEAL]

Attest:

RUTH C. MASON
Attesting Officer

LUTRELLE F. PARKER
Acting Commissioner of Patents and Trademarks